United States Patent [19]

Dokmo et al.

[11] Patent Number: 5,102,265
[45] Date of Patent: Apr. 7, 1992

[54] ADJUSTABLE WIDTH SPLIT SLEEVE AND METHOD OF FORMING ENDS THERETO

[75] Inventors: Richard C. Dokmo, Barrington; John M. O'Brien, Deerfield, both of Ill.; Al Lorenz, Seattle, Wash.

[73] Assignee: T C Manufacturing Co., Inc., Evanston, Ill.

[21] Appl. No.: 650,229

[22] Filed: Feb. 4, 1991

Related U.S. Application Data

[63] Continuation-in-part of Ser. No. 567,075, Aug. 31, 1990, abandoned.

[51] Int. Cl.$^5$ ............................................. E02D 5/60
[52] U.S. Cl. .................................. 405/216; 405/195.1
[58] Field of Search ............... 405/216, 107, 114, 115, 405/91, 92; 160/382, 383, 399, 391

[56] References Cited

U.S. PATENT DOCUMENTS

| | | |
|---|---|---|
| 2,928,411 | 3/1960 | Johnson . |
| 3,103,103 | 9/1963 | Liddell . |
| 3,141,306 | 7/1964 | Liddell . |
| 3,177,667 | 4/1965 | Liddell . |
| 3,181,300 | 5/1965 | Plummer . |
| 3,321,924 | 5/1967 | Liddell . |
| 3,448,585 | 6/1969 | Vogelsang . |
| 3,719,049 | 3/1973 | Shaw et al. . |
| 3,736,759 | 6/1973 | Blöse . |
| 3,939,665 | 2/1976 | Gosse et al. . |
| 3,975,915 | 8/1976 | Haw ........................ 405/107 X |
| 3,994,794 | 11/1976 | Bohne . |
| 4,023,374 | 5/1977 | Colbert et al. . |
| 4,058,985 | 11/1977 | Liddell . |
| 4,445,806 | 5/1984 | Crain . |
| 4,606,167 | 8/1986 | Thorne . |
| 4,697,957 | 10/1987 | Hellmers . |
| 4,713,129 | 12/1987 | Inhofe, Jr. et al. . |
| 4,764,054 | 8/1988 | Sutton . |

FOREIGN PATENT DOCUMENTS

| | | |
|---|---|---|
| WO87/05066 | 8/1987 | European Pat. Off. . |
| 2337792 | 1/1976 | France . |
| 31943 | 3/1981 | Japan . |

Primary Examiner—Dennis L. Taylor
Attorney, Agent, or Firm—Lee, Mann, Smith, McWilliams, Sweeney & Ohlson

[57] ABSTRACT

An adjustable width split sleeve adapted to be securely wrapped around an elongate member. The sleeve includes a pliable laminated sheet having a first end and a second end. Each end of the sheet is wrapped around a respective first rod. Each first rod is rotated about a second rod which is parallel and adjacent to the first rod but which is separated from the first rod by the sheet. The first and second rods may be positioned various distances from the edges of the sheet as desired to provide a desired width of the sleeve and to provide a tongue to seal the gap between the sheet ends. By positioning the rods in this manner, the rods on each end of the sheet, which are floating and not restrained nor clamped, will lock together from the tension applied to the sheet when the sleeve is secured around the elongate member. Each end of the sheet is securely gripped between the respective first and second rods. The sleeve is wrapped around the elongate member and the first and second ends of the sheet and their respective rods are fastened to one another by means such as cable ties. The sheet bottom is designed to overlap the sheet below to provide a seal between sheets. A method for making the laminated sheets by joining through thistle patches improves manufacture and installation.

14 Claims, 2 Drawing Sheets

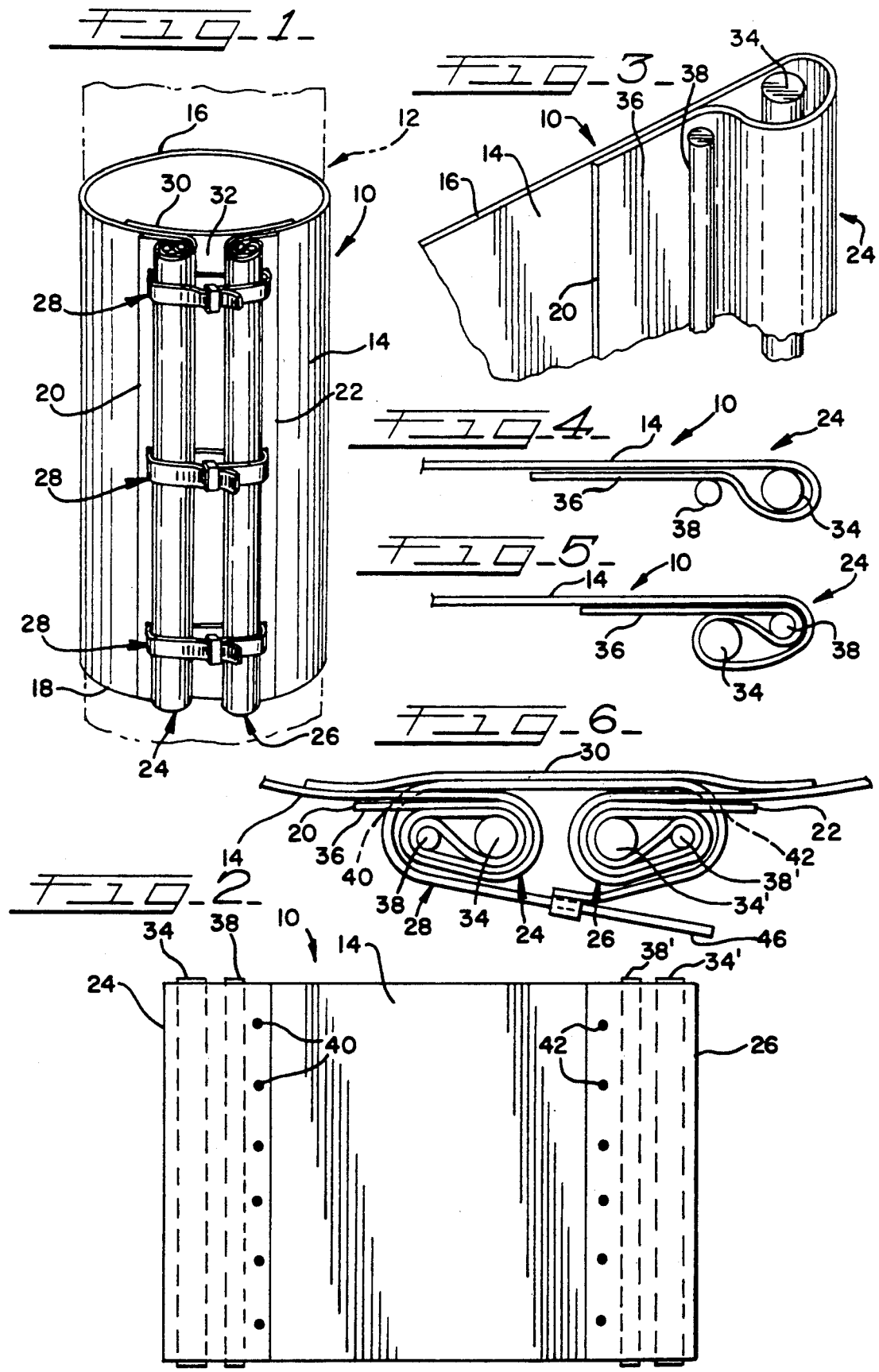

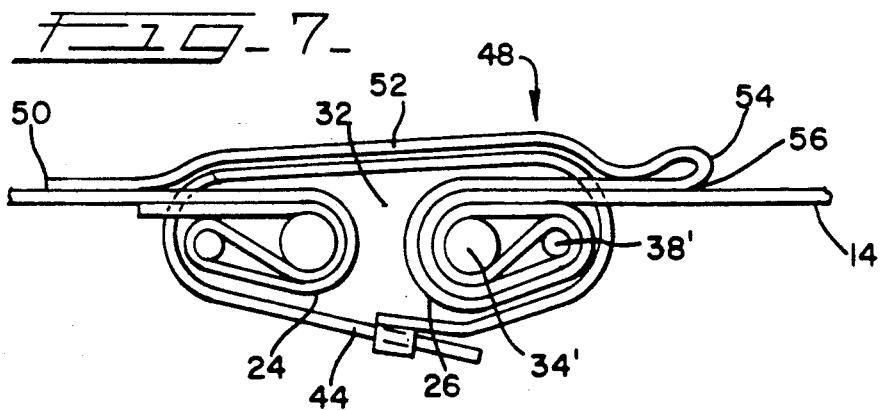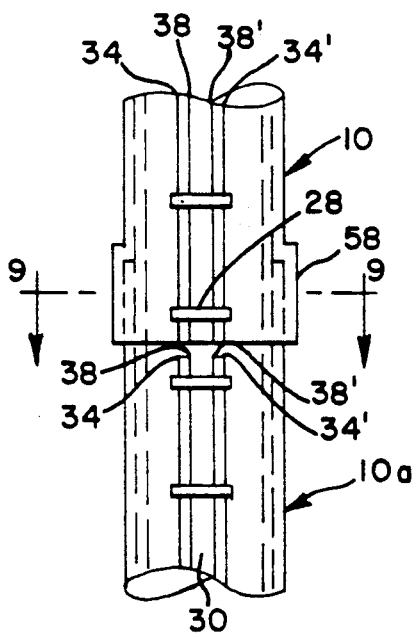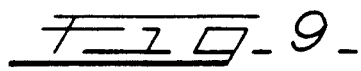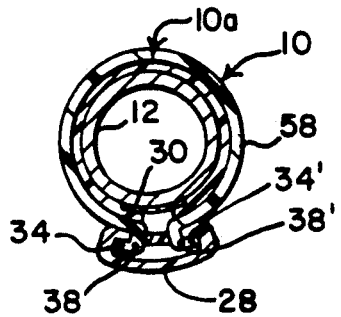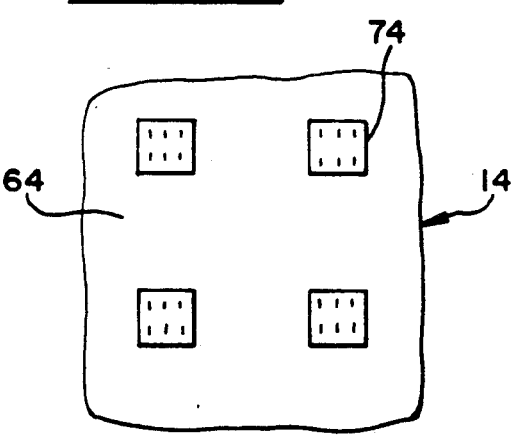

ADJUSTABLE WIDTH SPLIT SLEEVE AND METHOD OF FORMING ENDS THERETO

BACKGROUND OF THE INVENTION

This application is a continuation-in-part of application Ser. No. 576,075, filed Aug. 31, 1990 now abandoned.

The present invention relates to a device, and a method used to form the device, for protecting pilings from deterioration. Pilings used in offshore and even on shore structures such as piers and causeways require external protection in the tidal and splash zones as well as a distance below the low tide level. The purpose of the external protection is to prevent damage to the piles resulting from corrosion, decay and marine life which adheres to the surface of the piles. Piles exposed to the atmosphere or which are buried in the ground require similar protection. The piles may be metal, wood or concrete and may be of various configurations such as circular, rectangular, hexagonal or "I" and "H" sections.

Protection is commonly provided to a pile by wrapping sheeting around the pile in the area to be protected. The sheeting usually takes the form of a metal or plastic sleeve which may include a waterproof or antioxidant gel-like substance. One such commercially available device is the RETROWRAP Wraparound Pile Encapsulation System manufactured for N.I.C.C. Limited in Cirencester, United Kingdom and which is described in Strange, et al. PCT patent application no. PCT/GB87/00127 filed Feb. 20, 1987.

While prior pile protection devices have been used successfully, these devices have had two major points of weakness. First, prior devices have had rods secured to the ends of the sleeve by folding the end of the sleeve over the rod and sealing the adjacent sleeve material to the overlying sleeve material. This seal, which secures the rod to the sleeve, is subject to failure during long term operation. Second, due to the method in which the rods have been connected to the ends of the sleeves, each sleeve must be tailor made for each application as the width of the sleeve cannot be varied to accommodate various different sizes of piles.

It has therefore been found desirable to provide a sleeve in which the ends of the flexible sheet are securely connected to the rods while allowing the point of attachment of the rods to the sheet to be easily varied such that various widths of the sleeve may be provided as desired from a single size of sheet material.

SUMMARY OF THE INVENTION

The present invention provides a sleeve which is adapted to be securely wrapped around an elongate member such as a pile. The sleeve includes a generally rectangular pliable sheet, which may be multi-layered laminate, having a first end and a second end. A first rod and a second rod grippingly engage the first end of the sheet to form a first sleeve end and a third rod and a fourth rod grippingly engage the second end of the sheet to form a second sleeve end. The sleeve is wrapped around the elongate member whereupon the first and second sleeve ends and their respective rods are securely fastened to one another and are drawn together such that the sleeve is tightly wrapped around the elongate member.

The connection between the sheet material and the rods is made by initially placing the first rod against the sheet spaced from and parallel to the edge of the sheet. The end of the sheet is then folded over the first rod and the second rod is placed adjacent the first rod. The first rod is then rotated about the second rod so that the second rod is wrapped with two layers of the sheet. The second rod is then rotated about the first rod so that the first rod is wrapped with three layers of the sheet material. This interweaving and wrapping of the sheet material about the two rods creates a strong non-slip connection between the two rods and the sheet material. A plurality of apertures are then punched into the sheet material at each end of the sheet. The apertures provide an opening for the insertion of the strap of a cable tie, so that the cable tie may be securely wrapped around each sleeve end and its respective rods to draw the sleeve ends together.

The pliable sheet material, which may be a laminate, may be of one standard size permitting the sleeve to be made in various widths, from a maximum width to any smaller width. The width of the sleeve is adjusted by varying the initial positions at which the first rods are placed against the sheet material and this positioning may also provide for an end tongue to seal the gap between the sheet ends. The farther the first rods are placed from the ends of the sheet, the smaller the width of the resulting sleeve will be. Thus a sleeve of any desired width may be fabricated from a sheet material having a standard width.

The sheet bottom is designed to overlap the sheet below to provide a seal between sheets. A method for making the laminated sheets by joining through thistle patches improves manufacture and installation.

DESCRIPTION OF THE DRAWINGS

FIG. 1 shows a sleeve of the present invention having ends formed by the method of the present invention wrapped around an elongate member shown in phantom.

FIG. 2 is a side elevational view of the sleeve shown in an extended position.

FIG. 3 is a partial perspective view showing the initial placement of the rods at one end of the sheet material.

FIG. 4 is a partial end view of one end of the sheet showing the initial placement of the rods.

FIG. 5 is a partial end view of one end of the sheet showing the first rod rotated about the second rod.

FIG. 6 is a partial end view of the sleeve showing the second rod of each sleeve end rotated about the first rod, and the two sleeve ends secured together with a cable tie with a sealing tongue therebetween.

FIG. 7 is a view similar to FIG. 6 illustrating an alternate tongue embodiment made from a folded under portion of the sheet.

FIG. 8 is a view similar to FIG. 1 showing an upper sheet overlapped on a lower sheet to provide a seal between sheets.

FIG. 9 is a view taken substantially along the lines 9—9 of FIG. 8.

FIG. 10 is an end view showing the various sections in a laminated sheet with thistle patches used for joining.

FIG. 11 is a view taken substantially along the line 11—11 of FIG. 10.

DESCRIPTION OF THE PREFERRED EMBODIMENT

A sleeve 10 is shown in FIG. 1 securely wrapped around an elongate member 12 which is shown in phantom. The elongate member 12 may be a pile, leg, column, strut or any other member for which protection is desired. The elongate member 12 shown in FIG. 1 is circular, however the sleeve 10 may be used with elongate members having other cross sectional shapes.

The sleeve 10 includes a pliable sheet material 14 which may be of any suitable textile or plastic material or a combination of the two and may be a laminate of the same including layers of material impregnated with water proof, antioxidant or germicidal substances. The sheet 14 extends between an upper edge 16, a lower edge 18, a first edge 20 and a second edge 22. As shown in FIG. 3, a first sleeve end 24 of the sleeve 10 includes a first rod 34 and a second rod 38 which securely grip the sheet material 14 therebetween. A second sleeve end 26 of the sleeve 10 includes a first rod 34' and a second rod 38' which securely grip the sheet material 14 therebetween. The sleeve ends 24 and 26 are connected to one another by cable ties 28. The sleeve ends 24 and 26 are placed over a tongue 30 which is placed adjacent the elongate member 12 so as to seal the gap 32 between the sleeve ends 24 and 26.

The first sleeve end 24 is formed by placing the first rod 34 against the sheet material 14 parallel to and spaced a distance as desired from the first edge 20. The first rod 34 extends between the upper edge 16 and the lower edge 18 of the sheet 14. The first edge 20 and an end portion 36 of the sheet material which extends past the first rod 34 is wrapped around and folded over the first rod 34 as best shown in FIGS. 3 and 4. The second rod 38 is then placed against the folded over end portion 36 parallel and adjacent the first rod 34 as best shown in FIGS. 3 and 4. The second rod 38 extends substantially the same length as the first rod 34. The rods 34 and 38 are preferably cylindrical, however they may also be of various other shapes. It is also preferred that the second rod 38 be of a smaller diameter than the first rod 34. As can be seen in FIGS. 3 and 4, while the second rod 38 is adjacent the first rod 34 they are separated by the folded over end portion 36 of the sheet material 14.

After the second rod 38 is in position, the first rod 34 is then rotated about the second rod 38 to a position as shown in FIG. 5 wherein two plies of the sheet material 14 are wrapped around the second rod 38. The second rod 38 is then rotated about the first rod 34 to a position as shown in FIG. 6 wherein the first rod 34 is wrapped by three plies of the sheet material 14 thereby forming the first sleeve end 24. The second sleeve end 26 of the sleeve 10 is formed in substantially the same manner as the first sleeve end 24 was formed, by using a first rod 34' and a second rod 38'. Additional wraps of the material 14 around the respective rods 34 and 38, and 34' and 38', may be made but are not necessary.

Once the sleeve ends 24 and 26 have been formed, the sheet material 14 may be perforated to form a plurality of apertures 40 which are adjacent to and along the first sleeve end 24 and located to the interior of the sleeve end 24. A plurality of apertures 42 are also formed adjacent to and along the second sleeve end 26 to the interior of the second sleeve end 26 as shown in FIG. 2.

Once the sleeve ends 24 and 26 are formed, the sleeve 10 will have a specific width between the ends 24 and 26. While using the same size of sheet material 14, various other widths of the sleeve 10 may be formed by varying the initial placement of the first rods 34 and 34' against the material 14. For example, by locating one or both of the first rods 34 and 34' to positions which are closer to the center of the sheet material 14, a sleeve 10 will be produced which has a width which becomes progressively narrower as the location of the first rods 34 and 34' are moved closer to the center of the sheet material 14. On the other hand, as the initial placement of the rods 34 and 34' against the sheet material 14 are located progressively further from the center of the sheet material 14, the width of the sleeve 10 will become progressively wider. While a specific size of the sheet material 14 will have a maximum width between the sleeve ends 24 and 26, any narrower width of sleeve 10 may be produced by the appropriate placement of the first rods 34 and 34' prior to the forming of the sleeve ends 24 and 26.

In operation, the sleeve ends 24 and 26 are formed to produce a sleeve 10 having a desired width, which when wrapped around the elongate member 12 will leave a small gap 32 between the sleeve ends 24 and 26. A tongue 30, which may be made of the same material as the sheet 14, is initially placed against the elongate member 12 in a vertical position where the gap 32 will be located. Additional tongue members (not shown) may be circumferentially wrapped around the elongate member 12 at positions where the upper edge 16 and the lower edge 18 of the sleeve 10 will be located on the member 12. The sleeve 10 is then wrapped around the elongate member 12 such that both sleeve ends 24 and 26 and the apertures 40 and 42 are located on the tongue 30. A plurality of cable ties 44 each having a stem 46 are used to connect the first sleeve end 24 to the second sleeve end 26. The stem 46 of each cable tie 44 is inserted through an aperture 42 and is then inserted through a corresponding aperture 40. The cable ties 44 are then fastened such that the sleeve end 24, the sleeve end 26 and their respective rods 34, 34', 38 and 38' are fastened together within the cable ties 44. The cable ties 44 may then be tightened as desired to properly tension the sleeve 10. The cables ties 44 are spaced along the height of the sleeve 10 at a spacing which will insure a strong and secure watertight fit. The cable ties 44 prevent the sleeve ends 24 and 26 from rotating and thereby prevent the sleeve 10 from loosening around the elongate member 12 and lock it in place. The tongue 30 prevents water from contacting the elongate member 12 through the gap 32 or through the apertures 40 and 42.

In FIG. 7 there is shown an alternate tongue construction 48 wherein the second sleeve end 26 has rods 34' and 38' additionally spaced from the end 50 of the sheet 14 to provide a flap or tongue 52 which is folded under the ends 24–26 as at 54 and extends across and closes the gap 32. The unitary tongue construction eliminates the need for the separate tongue 30 shown in FIG. 1.

In installing the unitary tongue 52 it may be desirable to put adhesive at 56 to hold the tongue 52 in place until the cable ties 44 are tightened.

In those situations where the elongate member or piling 12 and the like is longer than the width of the sheet 14, it may be desirable or necessary to apply two sleeves 10 to cover the member. In such instances, it is necessary to provide a watertight joinder between the sleeves. Referring now to FIG. 8, there is shown a construction for providing such a watertight connection. As shown, the upper sleeve 10 overlaps the lower sleeve 10a. This construction is provided by removing the upper ends of the rods 34, 34', 38, 38', in sleeve 10a and overlapping the lower portion 58 of the upper sleeve 10 over the top of the sleeve 10a. The rod connectors 34, 34', 38, 38' and the cable tie 28 are then tightened to provide a watertight seal between the sleeve 10 and the sleeve 10a.

As mentioned earlier, the sleeve 14 may be a laminate of several materials. As shown in FIG. 10, the laminate may include a tough outer jacket 60 which is a synthetic waterproof material, an inner layer of high tensile material 62, a multi-layer jacket material 64 which provides strength and cushioning, an inner mat 68 which provides additional cushioning and a layer 70 of specially formulated corrosion inhibiting material. The inner mat 68 and the corrosion inhibiting material 70 can include such things as gels which may contain fungicides and the like, thixatropic material or oils and greases as may be desirable for protecting the piling and the like. Conventionally a layer of adhesive, as at 72, has been provided between the layers 62 and 64 to hold them together. Such a layer of adhesive material 72 has been of a conventional type and sometimes does not work well with some types of substances. Thus, a problem arose if the upper layers 68 and 70 are impregnated with a material that makes adhesion difficult. This has required the preparation of the laminate and then the application of the gel or other such material which has caused problems in manufacture. This need for an adhesive layer 72 has been eliminated by the use of thistle fasteners 74 which are attached to the multi layer jacket material 64 or for that matter to any of the other laminate layers 60 or 62. The inner mat 68 and the corrosion inhibiting material 70 can easily be joined to the inner laminate 64 by the thistle fasteners 74 since they grab hold of the inner mat 68 with sufficient strength to hold that portion of the laminate in place until the sleeve is applied to the elongated member or piling 12 and tightened in place by cable ties 28. Such a construction makes all the laminate sheets 14 much easier to make and eliminates the step of applying the corrosion inhibiting material or gel after the laminate has been constructed.

Various features of the invention have been particularly shown and described in connection with the illustrated embodiments of the invention, however, it must be understood that these particular arrangements merely illustrate, and that the invention is to be given its fullest interpretation within the terms of the appended claims.

What is claimed is:

1. A sleeve for protecting an elongate member adapted to be securely wrapped around and held in place on said elongate member, said sleeve comprising:
   a pliable sheet having a first end and a second end;
   a pair of parallel and separate gripping rods, the ends of which are free and unsupported, located adjacent said first end of said sheet, said pair of rods including a first rod and a second rod, said first rod having said first end of said sheet wrapped therearound such that said first rod is separated from said second rod by said sheet, said first end of said sheet being wrapped around said second rod such that the wrapping of said sheet around said first and second rods creates a nonslip connection between said first and second rods and said sheet; and
   means for connecting said first and second rods and said first end of said sheet to said second end of said sheet.

2. The sleeve of claim 1 additionally comprising a second pair of parallel and separate gripping rods, the ends of which are free and unsupported, located adjacent said second end of said sheet, said second pair of rods including a third rod and a fourth rod, said third rod having said second end of said sheet wrapped therearound such that said third rod is separated from said fourth rod by said sheet, said second end of said sheet being wrapped around said fourth rod such that the wrapping of said sheet around said third and fourth rods creates a nonslip connection between said third and fourth rods and said sheet.

3. The sleeve of claim 1 wherein said connecting means comprises at least one cable tie.

4. The sleeve of claim 1 additionally comprising a tongue adapted to be located under said sheet ends to provide a waterproof closure.

5. The sleeve of claim 1 wherein said rods at one end of said sheet are spaced from said end to provide a tongue adapted to be folded under said sheet ends to provide a waterproof closure.

6. A sleeve for protecting an elongate member adapted to be securely wrapped around said elongate member, said sleeve comprising:
   a pliable sheet having a first end and a second end;
   a first rod having said first end of said sheet wrapped around said first rod;
   a second rod extending parallel to and adjacent said first rod, said second rod being separated from said first rod by said sheet, said first end of said sheet being wrapped around said second rod, such that said first end of said sheet is securely gripped between said first rod and said second rod;
   a third rod having said second end of said sheet wrapped around said third rod;
   a fourth rod extending parallel to and adjacent said third rod, said third rod being separated from said fourth rod by said sheet, said second end of said sheet being wrapped around said fourth rod, such that said second end of said sheet is securely gripped between said third rod and said fourth rod, said rods at one end of said sheet being spaced inwardly from said end to provide a tongue adapted to be folded under said sheet ends to provide a waterproof closure; and
   means for connecting said first end of said sheet, said first rod and said second rod to said second end of said sheet, said third rod and said fourth rod.

7. The sleeve of claim 6 wherein said connecting means comprises at least one cable tie.

8. The sleeve of claim 6 additionally comprising a tongue adapted to be located under said sheet ends to provide a waterproof closure.

9. The sleeve of claim 6 wherein said rods at one end of said sheet are spaced from said end to provide a tongue adapted to be folded under said sheet ends to provide a waterproof closure.

10. A sleeve for protecting an elongate member adapted to be securely wrapped around said elongate member, said sleeve comprising:
   a pliable sheet having a first end and a second end;
   a first rod having said first end of said sheet wrapped around said first rod;
   a second rod extending parallel to and adjacent said first rod, said second rod being separated from said first rod by said sheet, said first end of said sheet being wrapped around said second rod, such that said first end of said sheet is securely gripped between said first rod and said second rod;

a tongue adapted to be located under said sheet ends to provide a waterproof closure; and means for connecting said first end of said sheet, said first rod and said second rod to said second end of said sheet.

11. The sleeve of claim 10 additionally comprising:

a third rod having said second end of said sheet wrapped around said third rod;

a fourth rod extending parallel to and adjacent said third rod, said third rod being separated from said fourth rod by said sheet, said second end of said sheet being wrapped around said fourth rod, such that said second end of said sheet is securely gripped between said third rod and said fourth rod.

12. The sleeve of claim 10 wherein said connecting means comprises at least one cable tie.

13. A sleeve for protecting an elongate member adapted to be securely wrapped around said elongate member, said sleeve comprising:

a pliable sheet having a first end and a second end;

a first rod having said first end of said sheet wrapped around said first rod;

a second rod extending parallel to and adjacent said first rod, said second rod being separated from said first rod by said sheet, said first end of said sheet being wrapped around said second rod, such that said first end of said sheet is securely gripped between said first rod and said second rod;

a third rod having said second end of said sheet wrapped around said third rod;

a fourth rod extending parallel to and adjacent said third rod, said third rod being separated from said fourth rod by said sheet, said second end of said sheet being wrapped around said fourth rod, such that said second end of said sheet is securely gripped between said third rod and said fourth rod;

a tongue adapted to be located under said rods to provide a waterproof closure; and means for connecting said first end of said sheet, said first rod and said second rod to said second end of said sheet, said third rod and said fourth rod.

14. The sleeve of claim 13 wherein said connecting means comprises at least one cable tie.

* * * * *